(No Model.)
C. T. INGRAHAM.
TOOL FOR DEHORNING CALVES.
No. 447,611. Patented Mar. 3, 1891.
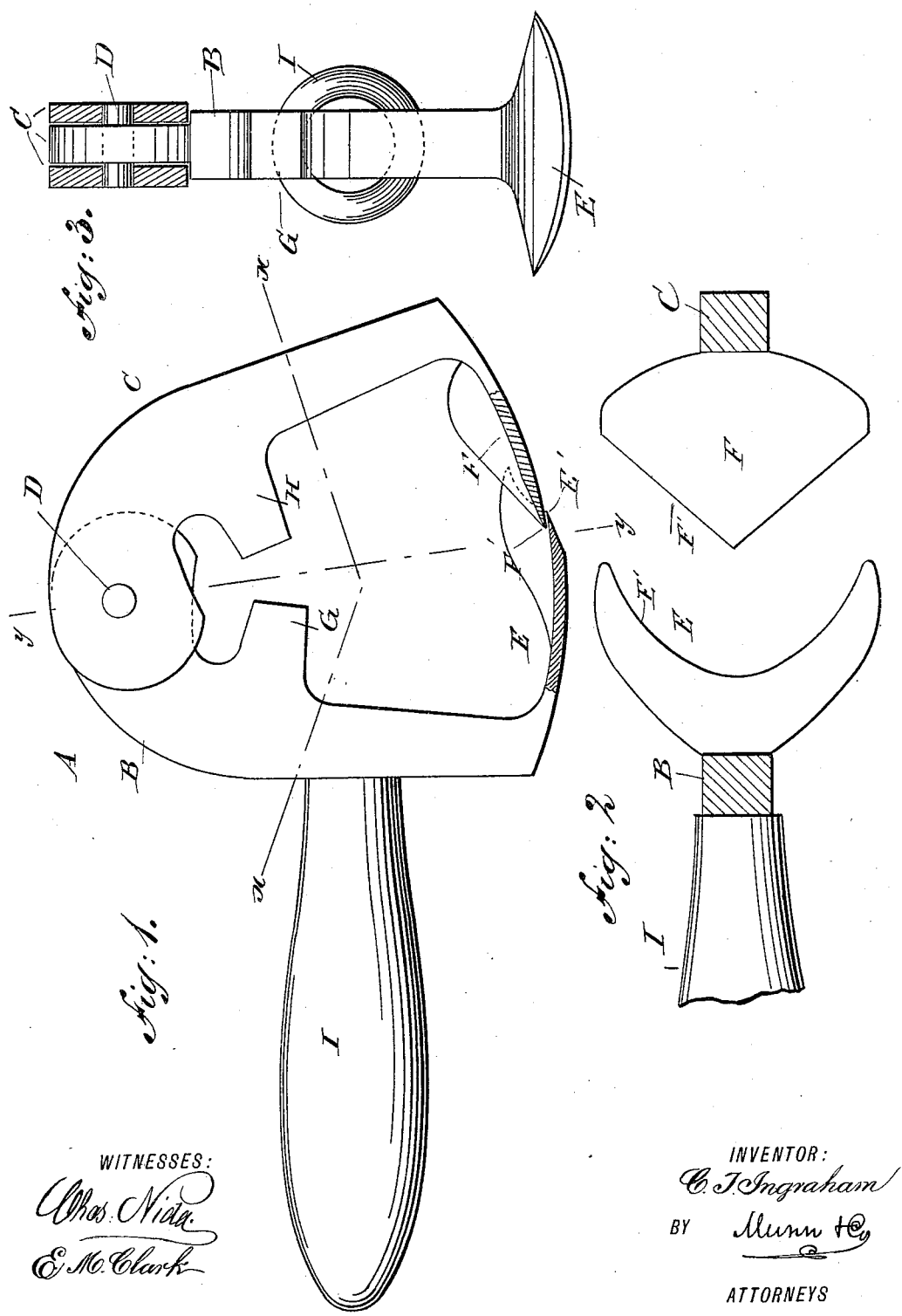
WITNESSES:
Chas. Nida
E. M. Clark
INVENTOR:
C. T. Ingraham
BY Munn & Co.
ATTORNEYS

United States Patent Office.

CHARLES T. INGRAHAM, OF DWIGHT, ASSIGNOR OF ONE-HALF TO SAMUEL W. GAMMON, OF CHICAGO, ILLINOIS.

TOOL FOR DEHORNING CALVES.

SPECIFICATION forming part of Letters Patent No. 447,611, dated March 3, 1891.

Application filed June 19, 1890. Serial No. 355,962. (No model.)

*To all whom it may concern:*

Be it known that I, CHARLES T. INGRAHAM, of Dwight, in the county of Livingston and State of Illinois, have invented a new and Improved Tool for Dehorning Calves, of which the following is a full, clear, and exact description.

The object of the invention is to provide a new and improved tool specially designed for conveniently and rapidly cutting out the horns of calves, so as to effectually destroy all further growth of the horns.

The invention consists of two knife-arms pivoted together and supporting knives of peculiar construction, one of the said knife-arms being provided with a handle, while the other is adapted to be struck by a suitable instrument to force its knife toward the other one.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement, with parts of the knives in section. Fig. 2 is a sectional plan view of the same on the line $x\ x$ of Fig. 1, and Fig. 3 is a transverse section of the same on the line $y\ y$ of Fig. 1.

The improved tool A is provided with two knife-arms B and C, connected with each other at the top by a pivot-pin D and provided at their lower ends with knives E and F, secured, respectively, thereto. The knives E and F are preferably segmental, the center being the pivot-pin D, and are also slightly dished from side to side, as is plainly shown in Fig. 1. The inner cutting-edges E' and F' of the said knives are preferably V-shaped, as is plainly shown in Fig. 2, the V-shaped edge F' of the knife F being adapted to fit onto the V-shaped edge E' of the knife E when the arm C is moved toward the arm B.

In order to limit the inward movement of the arm C, it is provided with a stop H, arranged below the pivot D and adapted to abut against a similar stop G, formed on the other arm B. When the two stops G and H meet, the two cutting-edges F' and E' have passed each other, though not necessarily touching, knife F coming out above knife E.

On the arm B is arranged a handle I, which extends at about right angles to the said arm and is taken hold of by the operator, while the other arm C is free to swing toward and from the arm B and is adapted to receive a blow struck by a suitable instrument, so as to move the knife F toward the knife E.

The device is used as follows: In order to dehorn an animal the knife-arms B and C are swung apart, and the operator by taking hold of the handle I places the two knives E and F on opposite sides of the horn, the bottoms of the knives resting on the skin surrounding the horn. By means of a suitable instrument a quick blow is struck on the arm C, so as to drive the knife F toward the knife E, whereby the cutting-edge F' cuts into or gouges out the horn beneath the skin, so as to effectually destroy the further growth of the horn. It will be seen that the knife F, in moving toward the other knife, enters the skin and cuts out the horn beneath the skin and comes out on the opposite side, having completely cut out the horn and the surrounding skin, so as to leave a concave opening, on account of the dished form of the knives.

It is understood that at the time when the blow is struck against the knife-arm C the operator securely holds the instrument by the handle I to retain the knife E against the skin near the horn.

Having thus fully described my invention, I claim as new and desire to secure by Letters Patent—

1. In a dehorning-tool, the combination, with two knife-arms pivoted together at the top, of knives secured to the free ends of the said arms and having V-shaped cutting-edges, the V-shaped cutting-edges being reversely formed, substantially as shown and described.

2. In a dehorning-tool, the combination, with two knife-arms pivoted together at the top, of knives secured to the free ends of the said arms and having V-shaped cutting-edges, and stops formed on the said knife-arms to limit the closing movement of the said knives, substantially as shown and described.

3. In a dehorning-tool, the combination, with two knife-arms pivoted together at the top, of knives secured to the free ends of the said arms and having V-shaped cutting-edges, and a handle secured on one of the knife-arms and standing at or about at right angles to the same, substantially as shown and described.

4. In a dehorning-tool, the combination, with two knife-arms pivoted together at the top, of knives secured to the free ends of the said arms and having V-shaped cutting-edges, a handle secured on one of the knife-arms and standing at or about at right angles to the same, and stops formed on the inner edges of the said knife-arms and arranged opposite each other, so as to limit the closing movement of the said knives, substantially as shown and described.

5. In a dehorning-tool, two oppositely-arranged dished knives having V-shaped cutting-edges, the V-shaped cutting-edges being reversely formed, substantially as shown and described.

CHARLES T. INGRAHAM.

Witnesses:
 DAVID RILING,
 E. H. KNEELAND.